D. A. T. BLACK.
Sleigh.
No. 59,345.
Patented Nov. 6, 1866.
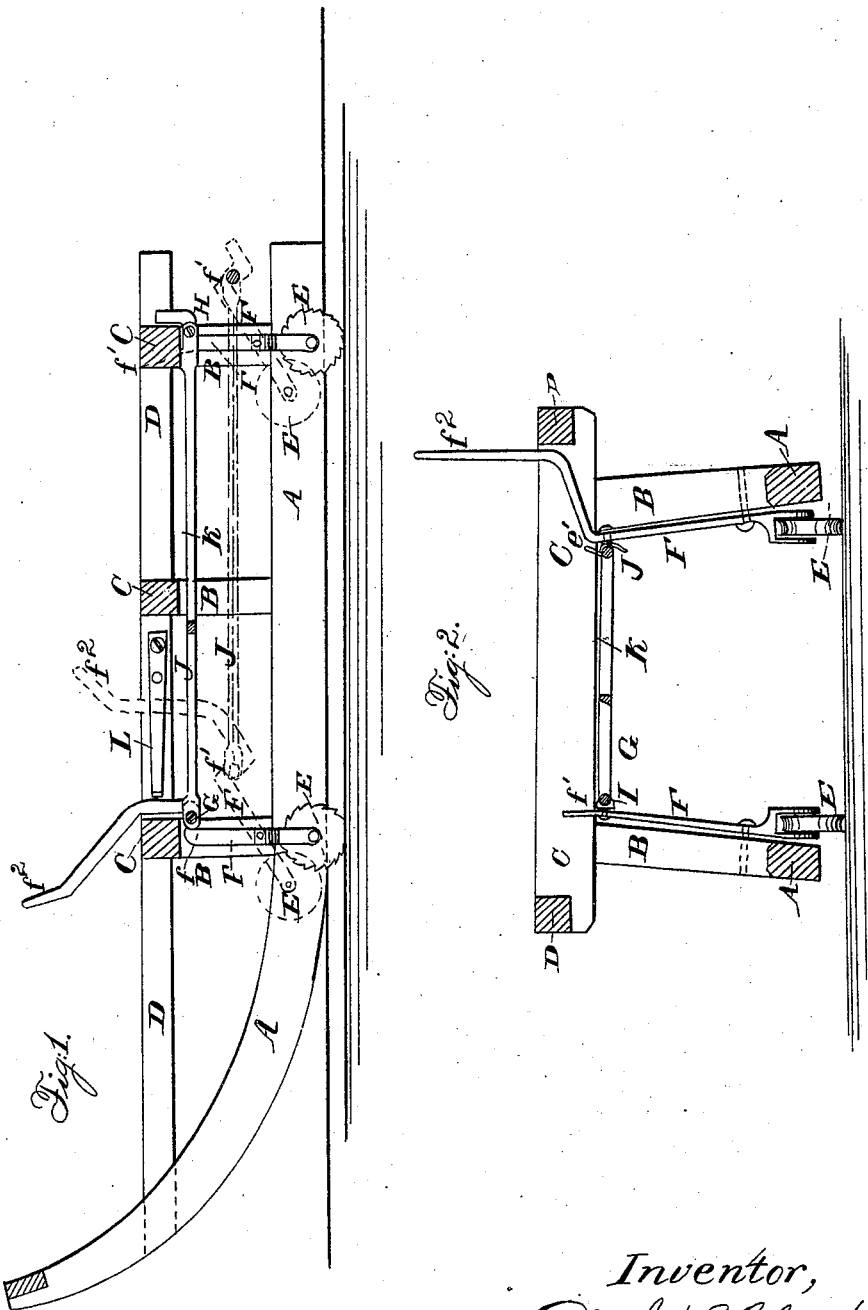
Witnesses,
Alex F Roberts
J. W. B Connington
Inventor,
D. A. T. Clark
per Munn &Co
Attorneys

UNITED STATES PATENT OFFICE.

D. A. T. BLACK, OF RAY'S HILL, PENNSYLVANIA.

IMPROVEMENT IN SLEIGHS.

Specification forming part of Letters Patent No. 59,345, dated November 6, 1866.

*To all whom it may concern:*

Be it known that I, D. A. T. BLACK, of Ray's Hill, in the county of Bedford and State of Pennsylvania, have invented a new and useful Improvement in Sleighs and Sleds; and I do hereby declare that the following is a full, clear, and exact description thereof, which will enable others skilled in the art to make and use the same, reference being had to the accompanying drawings, forming part of this specification, in which—

Figure 1 is a vertical longitudinal section of a sleigh with my improvement attached. Fig. 2 is a vertical cross-section of the same.

Similar letters of reference indicate like parts.

My invention consists in combining a set of wheels, levers, and bars with each other and with the frame of a sleigh or sled, for the purpose of enabling the said wheels to be used for transporting the sleigh over bridges or other places of the roadway which may be bare of snow, and also for retarding the velocity of the sleigh in going downhill.

A are the runners, B the knees, C the beams, and D the raves, of the sleigh or sled, about the construction of which parts there is nothing new. E are the wheels, which are pivoted to the lower ends of the arms or levers F, as shown in Figs. 1 and 2. These may be plain wheels, or their faces may be toothed, or toothed and grooved, as represented in the drawings. This latter construction I prefer, as it enables the wheels to take a firmer hold upon the ground when lowered to raise the sleigh or sled upon them. The arms or levers F are pivoted to the forward and rear knees B of the sleigh or sled, as shown in Figs. 1 and 2. The levers F extend up to the beams C, where they are bent twice at right angles, or have shoulders $e'$ formed upon them, as shown, upon which the under side of said beams rest when the sleigh or sled is supported upon the wheels E, the upwardly-projecting ends of said levers or arms resting against the rear sides of the beams C, and being thus held in a vertical position.

G is a cross-bar connecting the front pair of levers F, and H is a cross-bar connecting the rear pair of levers F.

I and J are longitudinal bars, the forward ends of which are pivoted to the cross-bar G, and their rear ends to the cross-bar H.

K is a diagonal brace to stiffen the frame formed by the bars G H I J, so that the levers F may all act together.

The upwardly-projecting end $f^2$ of one of the levers F may be lengthened, as shown in Figs. 1 and 2, and brought into such a position as to serve as a handle for operating the said levers F.

If desired, a spring, L, may be attached to the inner side of the rave D, to hold the levers F in a vertical position while the sleigh or sled is carried upon the wheels E; but this is not essential to the operation of the invention, as the forward draft of the sleigh or sled will hold the said levers in their places while the sleigh or sled is in motion.

By moving the handle $f^2$, or upper end of the lever F, back into the position shown in red in Fig. 1, the wheels E are lifted away from the ground, and the sleigh or sled allowed to run upon the runners A; but by moving the handle $f^2$ forward the wheels E are lowered, so as to come in contact with the ground, and by the advance of the sleigh or sled it is raised and carried upon the said wheels, as shown in Figs. 1 and 2.

What I claim as new, and desire to secure by Letters Patent, is—

The combination and arrangement of the wheel-levers F, with shoulders $e'$, and bars I and J, with the sleigh, whereby they are held in their lowered position for wheeling the sleigh by the forward draft of the sleigh, in the manner described, for the purpose specified.

D. A. T. BLACK.

Witnesses:
BARTLEY HUGHES,
JOHN H. SHOOK.